April 6, 1965 K. KUROSE 3,176,664
INTERNAL COMBUSTION ROTARY ENGINE
Filed March 4, 1963 2 Sheets-Sheet 1
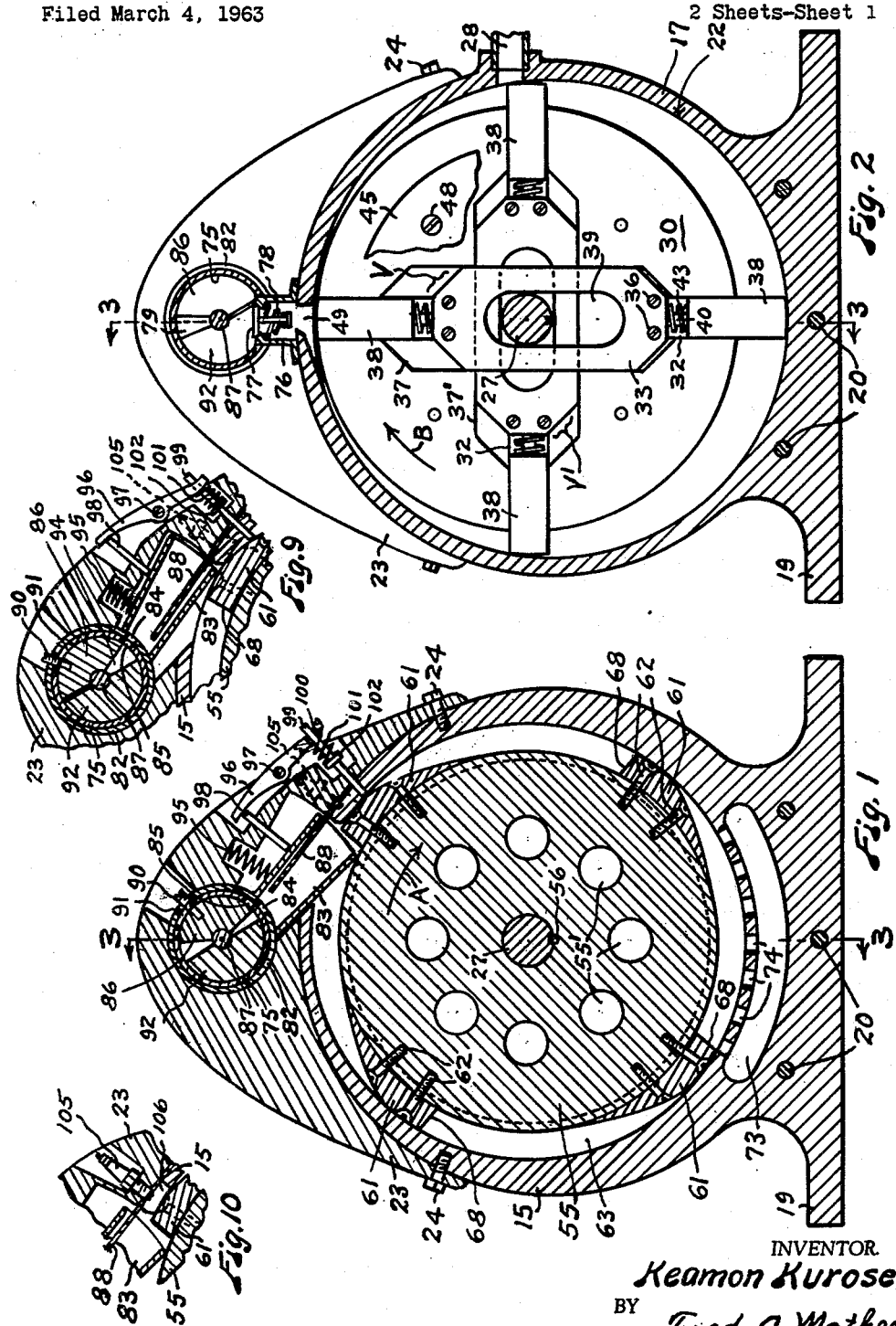
INVENTOR.
Keamon Kurose
BY Fred C. Matheny
ATTORNEY

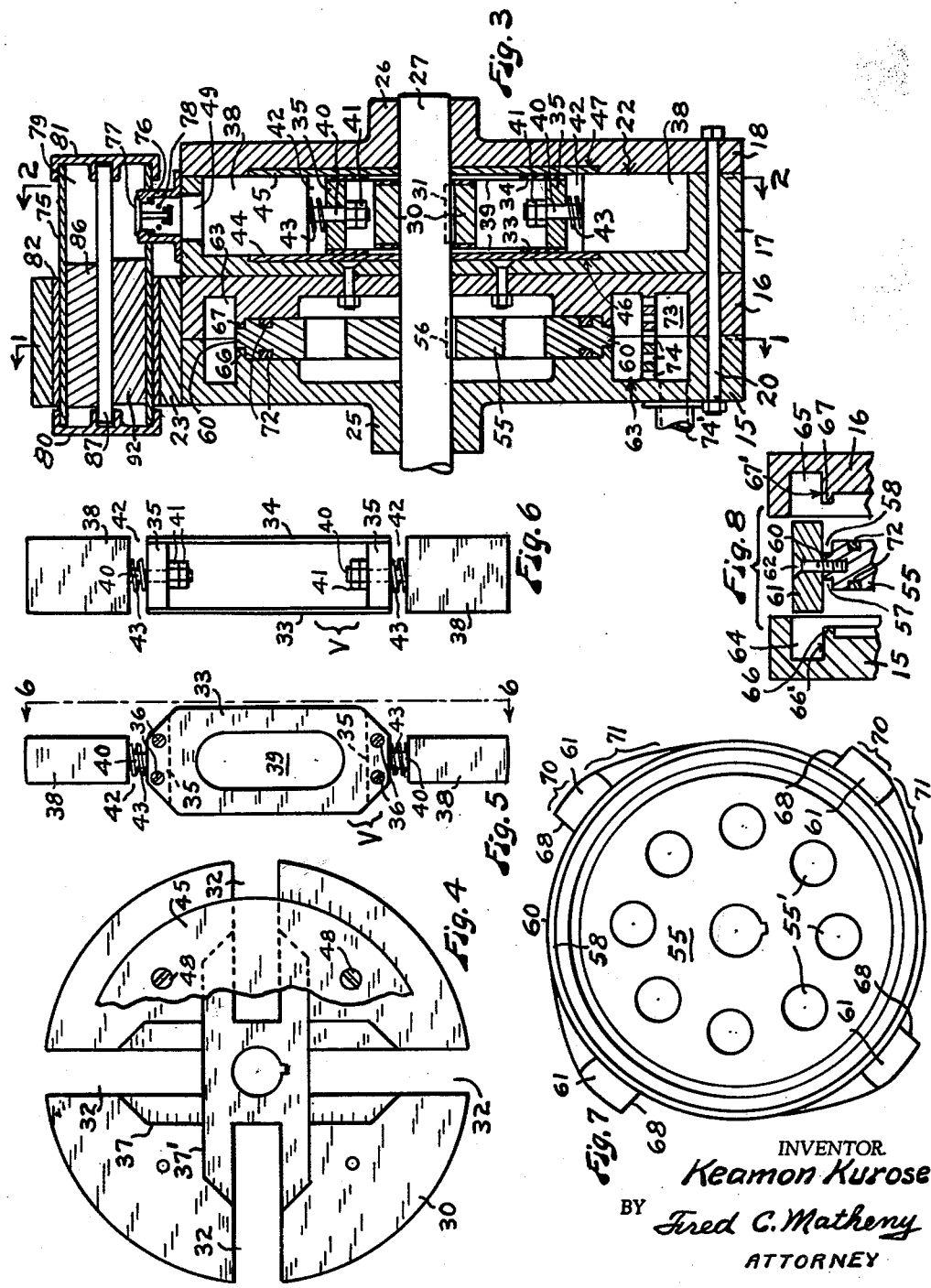

United States Patent Office 3,176,664
Patented Apr. 6, 1965

3,176,664
INTERNAL COMBUSTION ROTARY ENGINE
Keamon Kurose, 702 N. Mercer Way, Mercer
Island, Wash.
Filed Mar. 4, 1963, Ser. No. 262,458
4 Claims. (Cl. 123—15)

My invention relates to a rotary internal combustion engine.

A general object of my invention is to improve and increase the efficiency of rotary internal combustion engines of this type.

Another general object is to provide a rotary internal combustion engine which is fairly simple in construction and not expensive to manufacture.

Another object is to provide a rotary internal combustion engine embodying a power rotor and a compressor rotor disposed in two side-by-side compartments of the same housing, secured to the same shaft and operatively connected with each other through a common sleeve type valve.

Other objects are to provide a rotary engine which is well adapted to be made in various different sizes, which can be designed to provide from two to twelve explosions for each revolution of a power rotor, which will operate with a minimum amount of vibration and is capable of being operated efficiently with gasoline, kerosene, diesel oil or similar ordinary fuel, which can be air cooled, is well adapted for use as a source of power to propel air, water and land vehicles and is also well adapted for multiple use in which a plurality of these power units or engines are connected with the same shaft.

Other objects of my invention will be apparent from the following description and accompanying drawings.

In the drawings FIGURE 1 is a vertical sectional view of my engine taken substantially on and looking in the direction of broken line 1—1 of FIG. 3 and showing power generating means.

FIG. 2 is a view partly in elevation and partly in section taken substantially on broken line 2—2 of FIG. 3 and showing fuel compression means.

FIG. 3 is a vertical sectional view through my engine, taken substantially on and looking in the direction indicated by lines 3—3 of FIGS. 1 and 2.

FIG. 4 is a detached view in elevation showing one side of a compressor rotor embodied in the invention, the vanes being removed.

FIG. 5 is a detached elevation showing one side of a yoke and a pair of vanes used in the compressor rotor shown in FIG. 4.

FIG. 6 is an edge view of said yoke and vanes, looking in the direction indicated by broken line 6—6 of FIG. 5.

FIG. 7 is a detached view in elevation of a power rotor.

FIG. 8 is a fragmentary exploded sectional view showing parts of a power rotor and housing therefor.

FIG. 9 is a fragmentary sectional view of a fuel valve and combustion tube and parts associated therewith, showing the valve and combustion tube in a different position than they are shown in FIG. 1.

FIG. 10 is a fragmentary sectional view showing a spark plug and parts with which it is associated.

Like reference numerals refer to like parts throughout the several views.

The main engine housing, as herein illustrated, comprises four main parts 15, 16, 17 and 18 which can be secured together by any desired number of bolts 20 arranged in any desired manner. The housing parts 15, 16, 17 and 18 cooperate to provide a compression compartment 22 and a power compartment 63. A valve housing 23, which preferably is a separate part, is removably secured to the main housing by suitable means, such as cap screws 24. The valve housing 23 carries valves and control and ignition devices, as hereinafter explained. The main housing parts 15, 16, 17 and 18 are shaped to form a base 19.

The compressor compartment 22 and power compartment 63 are disposed alongside of each other and are both cylindrical but the compressor compartment 22 is larger than the power compartment 63, in diameter, and these two compartments are not coaxial but are tangent or coincident at one peripheral point, which is shown approximately uppermost in the drawings.

The two parts 15 and 18 of the housing are respectively provided with aligned bearing hubs 25 and 26 in which a transverse shaft 27 is received and rotatively supported. The shaft 27 and hub 25 are coaxial as respects the power compartment 63 but said shaft 27 and hub 26 are off-center, and as shown in FIGS. 2 and 3, are above center as respects the compressor compartment 22. An intake conduit 28, FIG. 2, through which gassified fuel can enter, is connected with the housing member 17 which forms the annular wall of the compressor compartment 22.

A flat disc shaped compressor rotor 30 is fixedly secured to the shaft 27 by means, such as a key 31, and is operatively disposed in the compressor compartment 22. The upper peripheral portion of the compressor rotor 30 is close to and substantially in sealing contact with the uppermost cylindrical wall of the compressor compartment 22, as hereinafter more fully explained. A plurality of radial vane-receiving notches 32 are provided in the rotor 30. Preferably I provide four of these notches 32, equidistantly spaced, but it will be understood that the number of these notches may be varied, depending on the number of vanes to be carried by the rotor 30. Two vane assemblies, indicated generally in FIG. 2 by V and V', are provided for cooperation with the rotor 30. The vane assembly V is shown detached in FIGS. 5 and 6 and the following description of this vane assembly V will apply also to the vane assembly V', the only difference in said two vane assemblies being a slight difference in the spacing of two side plates so the side plates of each assembly will clear the side plates of the other.

The vane assembly V comprises two spaced apart side plates 33 and 34 of thin metal disposed parallel to each other and having, between their outer ends, spacer members 35 to which the side plates are secured by screws 36. The spacer members 35 operate within the notches 32 of the rotor 30 and the side plates 33 and 34 operate within shallow recesses or grooves 37, FIG. 4, which are provided in the sides of the rotor 30. Each side plate 33 and 34 is provided with a longitudinally extending slot 39 which affords clearance for the shaft 27. Two flat rectangular vanes 38 are connected by stems or bolts 40 with the two spacer members 35 respectively of each pair of side plates and operate in the same rotor notches 32 as the spacer members 35 with which they are connected. Preferably the inner ends of the stems 40 are threaded and each is provided with two jam nuts 41 which can be adjusted and locked in a predetermined position. A narrow space 42 is left between the inner end of each vane 38 and the adjacent spacer member 35 and a short compression spring 43 is provided in each space 42 on the stem 40. The springs 43 yieldingly urge the two vanes 38 of each unit outwardly toward the internal wall of the compression compartment 22. The side plates 33 and 34, spacer members 35, stems 40 and jam nuts 41 tie the two vanes 38 of each unit together so that all parts of each vane unit or assembly move back and forth in the rotor notches 32 synchronously as the motor operates.

The vane assembly V', shown in a horizontal position in FIG. 2, is the same as the just described vane assembly V except that the side plates thereof are closer together by an amount just sufficient to avoid interference with the side plates 33 and 34 of the vane assembly V. Grooves 37′, FIG. 4, in the rotor 30 which receive the more closely spaced side plates of assembly V′ are a little deeper than are the grooves 37 which receive the side plates 33 and 34 of the vane assembly V.

The side plates 33 and 34 on the two opposite sides of the rotor member 30 are covered by thin discs 44 and 45, which are secured to the rotor 30 by screws 48, FIGS. 2 and 4. The discs 44 and 45 are disposed in shallow recesses 46 and 47, FIG. 3, in the main housing members 17 and 18, said recesses being cylindrical. The width of the vanes 38 is equal to the thickness of the marginal portion of the rotor 30 so that the edges of said vanes 38 seal against the housing members 17 and 18. The discs 44 and 45 are large enough in diameter and the vanes 38 are long enough so that, in operation, the inner end portions of the vanes 38 will never move outwardly beyond the peripheries of the discs 44 and 45 and the discs 44 and 45 will, at all times, completely cover the yokes or side plates 33 and 34 and seal the sides of said rotor 30. An outlet passageway 49 through which compressed gaseous fuel may be discharged, as hereinafter described, communicates with the upper portion of the compression compartment 22.

A flat disc shaped power rotor 55 is disposed within the power compartment 63 of the main housing and is fixedly secured to the shaft 27 by a key 56 or like means. The circumferential portion of the power rotor 55, see FIG. 8, is provided on opposite sides with two annular corner grooves 57 and 58 which are L-shaped in outline and provide between them a narrow circular peripheral flange or rib 60 upon which four equidistantly spaced apart vanes 61 are rigidly secured. Preferably screws 62 are used to secure the vanes 61 to the power rotor 55 so that said vanes 61 are readily replaceable. Major portions of the vanes 61 are of a width substantially greater than the thickness of the power rotor 55 so that they overhang the sides of said rotor 55, as best shown in FIG. 8. These wider parts of the vanes are of suitable size and shape so that they fill and have a working clearance within the annular rotor chamber 63 which is formed by two registering annular grooves or channels 64 and 65 in the peripheral portions of the respective housing members 15 and 16. Also the housing members 15 and 16 are respectively provided with flanges 66 and 67 which fit within the L-shaped corner grooves 57 and 58 of the rotor 55 when the parts are in assembled relation.

The peripheral rib 60 of the rotor is narrow and its circumferential wall is substantially flush with the cylindrical housing surfaces 66′ and 67′ formed in part by the flanges 66 and 67. This helps in minimizing friction, as hereinafter explained. The rotor vanes 61 each have a shoulder 68 against which the pressure of expanding gases can be exerted to drive the rotor 55 together with the shaft 27 and compressor rotor 30 in the direction indicated by arrows A and B in FIGS. 1 and 2 respectively.

The peripheral portion of each vane 57 has a cylindrical part 70, FIG. 7, which, considered in the direction of rotation of the rotor 55, is immediately in advance of the radial shoulder 68 of the vane. This part 70 and other parts of each vane operate close enough to the walls of the power chamber 63 to prevent blow-by of expanding gases but do not rub these walls hard enough to produce much frictional resistance or generate much heat. The peripheral portion of each vane 61 also has an inclined or cam part 71 which cooperates with an end portion of a swingingly movable combustion tube 83, as hereinafter explained.

Preferably two sealing rings 72 are provided in the respective side faces of the power rotor 55 a short distance inwardly from the periphery of said rotor 55 to seal the sides of the power rotor against blow-by of gases and at the same time hold to a minimum frictional resistance between the power rotor 55 and the housing parts 15 and 16. Preferably transverse perforations are provided in the power rotor 55 inwardly from the sealing rings 72 to minimize weight. These perforations are numbered 55′.

Exhaust cavities 73, FIGS. 1 and 3, are provided in the base portions of the housing members 15 and 16 and communicate through perforations 74 with the power rotor chamber 63. Preferably an exhaust pipe 74′ communicates with the exhaust cavity 73 of housing member 15.

A valve assembly is provided in the valve housing 23. This valve assembly comprises a longer valve tube 75 non-rotatively supported in the valve housing 23 and extending a substantial distance outwardly from the side of the housing 23 shown at the right in FIG. 3 so that it overhangs the compressor housing formed by parts 17 and 18. A suitable tubular conduit member 76 is rigidly connected between the overhanging end portion of the tube 75 and the housing member 17 of the compressor unit. The tubular conduit member 76 registers with the fuel outlet opening 49 of the compressor unit so that compressed fuel gas can pass therethrough from the compressor into the tube 75. A check valve 77, which is normally held closed by a spring 78, is provided in the fitting 76 and arranged so that it will let compressed fuel gas pass into the tube 75 but will prevent return flow of the gas from the tube 75 to the compressor unit. The fitting 76 holds the tube 75 non-rotatable. Two caps 80 and 81, FIG. 3, are provided on the respective ends of the tube 75 and form gas tight closure means therefor.

An outer valve tube or sleeve 82 is rotatably supported on the part of the tube 75 which extends across the power unit of the motor. A combustion tube 83, FIGS. 1 and 9, has one end portion rigidly secured to the outer tube or sleeve 82 and extends approximately perpendicularly from said sleeve 82. The outer end of the combustion tube 83 rests on the periphery of the power rotor 55 and its vanes 61. A port 84 in the outer sleeve 82 communicates with the interior of the combustion tube 83. A port 85 in the inner and longer valve tube 75 is positioned so that the port 84 of the sleeve 82 can be moved into and out of registration with it by oscillation of said sleeve 82. The outer end portion of the combustion tube 83 rests on the circumferential portion of the power rotor 55 and vanes 61 and said combustion tube 83 is angularly moved by the vanes 61 against yieldable means hereinafter described so that it oscillates the sleeve 82 on the tube 75 enough to move the port 84 into and out of registration with the port 85 as the rotor 55 rotates in the direction indicated by arrow A in FIG. 1. A tongue 88 of fairly stiff material is secured to the valve housing 23 and extends into the combustion tube 83 to a point near but not against the valve tube 82. This tongue 88 helps to prevent mixing of fresh fuel gas and burned gases and helps in crowding the burned gases out of the combustion tube 83. A valve member 86, which is at least partly cylindrical in cross section, is disposed within the fixed valve tube 75 and is preferably secured to an axial bearing rod 87. The rod 87 is rotatively supported by the end caps 80 and 81. The valve member 86 is connected by a screw 90 with the sleeve 82 so that said valve member 86 will move rotatively with the sleeve 82 and will move simultaneously with said sleeve or valve tube 82 over and clear of the port 85. This provides a double seal and insures tight valve closure at the location of ports 84 and 85. The screw 90 is threaded through the sleeve 82 and extends through an annular slot in the fixed valve tube 75 and has its inner end embedded in valve member 86.

Preferably a filler member 92 is disposed within the valve tube 75 and is rigid therewith. The filler member 92 is large enough in cross section so that it occupies most of the space within the tube 75 which is not occupied by the valve member 86 but still leaves enough space for the desired opening and closing movement of said valve member 86. When the valve member 86 is in the open position, shown in FIG. 9, a passageway 94 of restricted area will be provided for the flow of compressed gas from a compressed gas chamber 79 in the end portion of the tube 75 shown at the right in FIG. 3 to the combustion tube 83. Keeping the compressed gas in this passageway 94 of small cross sectional area prevents undesirable expansion of the compressed gas within the valve tube 75.

The combustion tube 83 is yieldingly urged toward the power rotor 55 by preferably two resilient devices. One of these devices is a compression spring 95 interposed between the combustion tube 83 and valve housing 23. The other devices comprises a rocker arm 96 fulcrumed on a pivot pin 97 and arranged so that when it is angularly moved in one direction by one of the rotor vanes 61 it will exert an inward pressure on the combustion tube 83 tending to hold an end portion of said tube 83 in contact with the circumferential portion of the rotor 55. As illustrative of one way of bringing about this mode of operation of the rocker arm 96 I provide one radially movable pin 98 between one end of the rocker arm 96 and the combustion tube 83 and another radial pin 99 between the power rotor 55 and the other end of the rocker arm 96. Both pins 98 and 99 are slidably guided in the valve housing 23. The pin 99 is slidable through a perforation 100 in an end portion of the rocker arm 96. One end of a compression spring 101 on the pin 99 rests on a fixed collar on said pin 99 and the other end of said spring 101 rests against the rocker arm 96. When the pin 99 is moved outwardly by one of the vanes 61 the rocker arm 96 will exert an inward pressure on the other pin 98 pressing it against the combustion tube 83. The spring 95 exerts an approximately constant inward pressure on the combustion tube 83 at all times. The pin 99 is positioned so that it will cause the lever arm 96 and pin 98 to exert an inward pressure on the tube 83 at about the time the end of said tube 83 clears the shouldered end of each vane 61. This insures a quick and positive drop of the outer end portion of the combustion tube 83 as soon as it is cleared by the shouldered end of each vane 61.

An ignition device, illustrated by full lines in FIG. 10 and by dotted lines in FIGS. 1 and 9 as a spark plug 105, is provided. The inner end portion of spark plug 105 is positioned within a recess 106 which is inwardly from the tongue 88 and directly opposite and close to the open end of the combustion tube 83 when said tube 83 is in the firing position in which it is shown in FIGS. 1 and 10. Any conventional timing means can be employed to cause the spark plug 105 to deliver a spark at the proper instant just after the combustion tube has dropped off of the shouldered end of each vane 61. Also heat dissipating vanes can be provided on the exterior of any or all of the housing members 15, 16, 17 and 18, if desired.

The operation of my rotary motor is as follows: Suitably gassified or carburetted fuel and air are supplied to the fuel inlet conduit 28. This gassified fuel is drawn from conduit 28 into an expanding rotor chamber after each vane 38 of the compressor unit passes said conduit 28. The fuel thus drawn in is carried around by the next vane 38 to the rear of the one by which it is drawn in and, as it approaches the valve hosuing 23, is compressed and forced through the passageway 49 and conduit 76 and past the check valve 77 into the compressed fuel chamber 79 of the valve tube 75. This provides a constant supply of compressed fuel in the chamber 79 when the engine is operating. This compressed fuel moves through the restricted valve passageway 94 and is available at the location of the valve ports 84 and 85.

When the combustion tube 83 is in the lowered position in which it is shown in FIG. 1 the valve ports 84 and 85 are closed. When a vane 61 passes under the thus lowered combustion tube 83 it will lift said tube 83 into the position in which it is shown in FIG. 9 and, in so doing, will rotatively move the valve sleeve 82 and the valve member 86 and open the ports 84 and 85. As said combustion tube 83 is being moved from the lowered to the raised position the tongue 88, although it fits loosely in the combustion tube 83, will tend to crowd by-products of combustion from a previous explosion out of said tube 83. Also a fresh charge of gas, being admitted through the ports 84 and 85 as the tube 83 moves upwardly will enter the tube 83 above the tongue 88 and will not mix with the burned gases as much as it would if the tongue were not provided. As soon as a vane 61 clears the end of the combustion tube 83 said tube will be moved downwardly and will close the ports 84 and 85. As the combustion tube 83 moves downwardly the fresh charge of gas above the tongue 88 will pass around the inner end and around the edges of said tongue 88 and fill the space in the combustion tube 83 below said tongue. At about the time the combustion tube 83 reaches its lowermost position, in which it is shown in FIGS. 1 and 10, the fresh charge of gas will be ignited by a spark from the spark plug 105. The exploding gas will react expansively against the shoulder 68 of the adjacent vane 61 and impart a driving impulse to the rotor 55. The by-products of combustion will be carried around in the same rotor chamber in which they expanded and will be discharged through the exhaust conduits 74, 73 and 74'. This imparts a power impulse to the rotor 55 each time a vane 61 passes the combustion tube 83.

When gas explodes in the tube 83 the pressure exerted in said tube in a direction away from the rotor 55 is approximately equal to the pressure exerted toward the rotor. Thus the force of the explosion does not, to any great extent, tend to cause the tube 83 to bear heavily on the rotor 55. Thus friction and drag of the combustion tube 83 on the power rotor 55 is minimized and a condition conducive to smooth and efficient operation is created. Making the part 60 of the rotor 55 narrow and having the combustion tube 63 extend over and rest on the wall parts 66' and 67' of housing members 15 and 16 also helps to minimize friction between the combustion tube 83 and the rotor 55 since pressure tending to move the combustion tube 83 toward the rotor 55 will, to a large extent, be borne by the non-rotatable wall parts 66' and 67'.

The foregoing description and accompanying drawings disclose a preferred embodiment of my invention but it will be understood that this disclosure is merely illustrative and that changes may be made within the scope of the following claims.

I claim:

1. In a rotary internal combustion engine, a rotor housing having therein a cylindrical rotor compartment; a power rotor in the said rotor compartment, said power rotor having circumferential vanes each provided with an end portion which is inclined relative to the periphery of the rotor forming a cam; tubular valve means including a valve tube fixed relative to said rotor housing and communicating with the compressor compartment thereof and a valve tube snugly telescopically interfitting said fixed valve tube and oscillatingly movable relative to said fixed valve tube, said two valve tubes having therein ports which are movable into and out of registration with each other by oscillation of said movable valve tube relative to said fixed valve tube; conduit means communicatively connected with said fixed valve tube adapted to supply fuel under pressure thereto; a combustion tube extending between said tubular valve means and said power rotor compartment and being substantially tangential to said power rotor, one end of said combustion tube being rigidly secured to said movable valve tube and encompassing the port of said movable valve tube and the other end of said combustion tube being open and adapted to communicate with said power rotor compartment and resting against the vane carrying circumferential portion of said power rotor; yieldable means urging said combustion tube toward said power rotor, whereby rotation of said power rotor will oscillate said combustion tube and said movable valve tube and provide opening and closing movement of the ports in said two valve tubes; and a tongue member supported from the rotor housing adjacent the open end of said combustion tube and extending into said combustion tube toward said valve tubes and terminating in an inner end portion positioned adjacent to but spaced a short distance from said outer valve tube, said tongue member functioning in the combustion tube as a loosely fitting stationary partition relative to which the combustion tube moves and around the inner end of which incoming fuel gases pass from one side to the other of said tongue member.

2. The apparatus as claimed in claim 1 in which a check valve is provided between said fixed valve tube and said fuel supply conduit means.

3. In a rotary internal combustion engine, a rotor housing having therein a cylindrical rotor compartment; a power rotor in said rotor compartment; circumferential vanes on said power rotor, each vane having an end portion which provides an approximately radial shoulder and another end portion which is inclined and provides a cam surface; a valve housing rigid with said rotor housing; tubular valve means in said valve housing, said valve means including an inner valve tube fixed relative to said two housings and communicating with the compressor compartment in the rotor housing and an outer valve tube snugly and telescopically fitting over said fixed inner valve tube, said two valve tubes having therein ports which are movable into and out of registration with each other by oscillation of said outer valve tube relative to said inner valve tube; conduit means communicatively connected with said fixed valve tube adapted to supply fuel under pressure thereto; a combustion tube extending between said tubular valve means and said power rotor compartment and being substantially tangential to said power rotor, one end of said combustion tube being rigidly secured to said outer movable valve tube and encompassing the port in the wall of said outer movable valve tube and the other end of said combustion tube being open and being adapted to communicate with said power rotor compartment and resting against the vane carrying circumferential portion of said power rotor; yieldable means urging said combustion tube toward said power rotor, whereby rotation of said power rotor will oscillate said combustion tube and said outer valve tube and open and close the ports of said two valve members; a tongue member supported from the rotor housing adjacent the open end of said combustion tube and extending into said combustion tube toward said valve tubes and terminating in an inner end portion positioned adjacent to but spaced a short distance from said outer valve tube, said tongue member functioning in the combustion tube as a loosely fitting stationary partition relative to which the combustion tube moves and around the inner end of which incoming fuel gases pass from one side to the other of said tongue member; a rotatively movable valve member within said fixed inner valve tube; and means connecting said valve member with said outer valve tube for synchronous rotary movement of said valve member and outer valve tube, said valve member and the port in said outer valve tube being relatively positioned so that said valve member and said outer valve tube will simultaneously open and close the port in said inner fixed valve tube and thereby provide a double seal when they are in a closed position relative to said inner valve tube port.

4. In a rotary internal combustion engine, a cylindrical rotor housing; a disc shaped power rotor rotatively disposed in said housing, said power rotor having a circumferential portion of narrow width and the rotor housing outwardly from said narrow circumferential rotor portion being recessed to provide an annular chamber of substantially greater width than the annular circumferential portion of the rotor, said chamber having cylindrical walls flush with the periphery of the rotor and extending perpendicularly outward from each side of said rotor periphery; vanes rigid with the narrow circumferential portion of said rotor, at least a portion of each vane being wider than the narrow circumferential rotor portion and overhanging said narrow circumferential rotor portion and substantially filling and operating within the wider annular housing chamber outwardly from said narrow circumferential rotor portion, one end of the wider portion of each vane forming a shoulder against which expanding gases can react and the other end of each said wider vane portion terminating in a narrow inclined cam which merges with the periphery of the rotor; a combustion tube having an outer end portion pivotally supported by said rotor housing external to said annular housing chamber, said combustion tube being adapted to extend substantially tangentially into said annular housing chamber and having an open inner end adapted to rest on the cylindrical housing walls at the sides of the rotor and to be in light frictional contact with the periphery of the rotor when the open inner end portion of the combustion tube is in its innermost position, said vanes being adapted to swingingly move said combustion tube outwardly when the rotor rotates; resilient means urging the open end portion of said combustion tube toward said rotor; and fuel supply means communicating with the pivotally supported end portion of said combustion tube.

References Cited by the Examiner
UNITED STATES PATENTS

| 1,147,428 | 7/15  | Peterson   | 123—8   |
| 1,637,484 | 8/27  | Hapgood    | 230—153 |
| 1,767,097 | 6/30  | Richardson | 123—15  |
| 2,349,481 | 5/44  | Wallace    | 123—8   |
| 2,358,165 | 9/44  | Ingram     | 123—15  |
| 2,812,748 | 11/57 | Simonian   | 123—8   |
| 2,821,176 | 1/58  | Koser et al. | 123—15 |
| 2,938,505 | 5/60  | Quartier   | 123—15  |

KARL J. ALBRECHT, *Primary Examiner.*

JOSEPH H. BRANSON, Jr., *Examiner.*